Apr. 24, 1923.

A. J. V. McDONNELL 1,453,151

POCKET STERILIZING CASE FOR CLINICAL THERMOMETERS

Filed Dec. 22, 1921

INVENTOR
Alexander Joseph Vincent McDonnell

By
his ATTORNEY

Patented Apr. 24, 1923.

1,453,151

UNITED STATES PATENT OFFICE.

ALEXANDER JOSEPH VINCENT McDONNELL, OF LONDON, ENGLAND.

POCKET STERILIZING CASE FOR CLINICAL THERMOMETERS.

Application filed December 22, 1921. Serial No. 524,261.

*To all whom it may concern:*

Be it known that I, ALEXANDER JOSEPH VINCENT McDONNELL, a subject of His Majesty the King of Great Britain, residing at 39 Stamford Hill, London, N. 16, England, have invented certain new and useful Improvements in or Relating to Pocket Sterilizing Cases for Clinical Thermometers, of which the following is a specification, reference being had therein to the accompanying drawing.

This invention relates to an improvement in or relating to pocket sterilizing cases for clinical thermometers of the kind in which the thermometer is suspended in a tube made of glass or other transparent material permanently closed at its lower end and containing an antiseptic fluid the said glass or like tube being enclosed in an outer protecting case which is formed with a slot or slots through which the thermometer the inner tube and the antiseptic fluid may be seen.

In order to fill the inner tube with the requisite quantity of antiseptic fluid it was necessary to employ a syringe or the like to inject the fluid into the tube and in order to empty the tube it was necessary to swing or jerk the same.

The chief object of the present invention is to overcome this inconvenience and this I effect by leaving the glass or like tube open at its lower end and closing the same by means of a suitable plug or cap which is readily applied to the tube or removed from the same.

When the closing device has been removed any fluid therein will flow therefrom by gravity, aided, if necessary by a slight swing. In order to insert the requisite quantity of antiseptic fluid into the tube the lower end thereof is inserted into the fluid as far as necessary, the upper end of the tube being left open. The fluid will find its own level in the tube in known manner. A finger is then placed on the upper end of the tube and it is withdraw from the fluid, lifting the fluid within the tube like a pipette. The lower end of the glass or like tube is then closed by the plug or cap and the tube is inserted into the outer protecting case.

Figure 1:
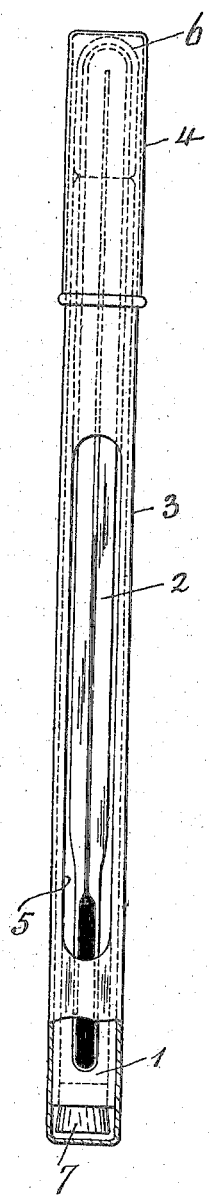

In the annexed drawings Figure 1 is a part sectional elevation of a pocket sterilizing case for clinical thermometers in accordance with my invention.

Figure 2:
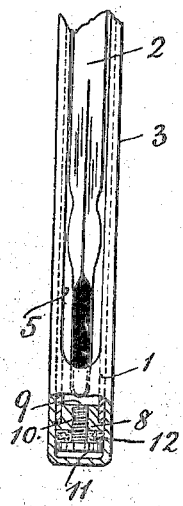

Fig. 2 is a similar view showing a slight modification.

Referring to Fig. 1, 1 is the sterilizing tube, 2 is the thermometer, 3 is the outer protecting case, 4 is the ordinary upper cap or closure, 5 is a slot in the outer case 3, and 6 is a cap or head on the thermometer which seats on the edge or lip of the sterilizing tube 1 and thus suspends the thermometer in said tube.

As shown in Fig. 1, the glass tube 1 is open at its lower end and closed by means of a cork or india rubber or other suitable plug 7 which has a liquid tight fit in the tube 1 but is not so tight as to render it difficult to insert or withdraw the same. The plug 7 is sufficiently long so that when it is in place in the tube 1 a portion is left projecting from the tube by which the plug may be readily withdrawn. The plug 7 should not enter the tube 1 to such an extent that it touches the thermometer 2 as in that case the cap 6 would not seat itself properly on top of the tube 1.

Referring to Fig. 2, a plug 8 fixed as by cement or the like in the lower end of the tube 1 has a screw threaded passage 9 extending through it into which screws the stem 10 of the screw stopper 11. 12 is a washer of india rubber or the like between the stopper head 11 and the plug 8, to ensure against any possible leakage.

If desired, the closures shown may be replaced by a closely fitting cap made of any suitable material such as rubber or metal, and in this latter case the lower end of the cap would be fitted with a suitable soft pad to make a liquid-tight joint with the lower end of the sterilizing tube 1.

What I claim and desire to secure by Letters Patent of the United States is:—

The combination of a clinical thermometer, a sterilizing tube open at both ends, an enlargement on the thermometer adapted to seat on the lip of the sterilizing tube to thereby hold the thermometer suspended in said tube, a plug projecting sufficiently from said end to be readily grasped, and an outer protecting case in which the sterilizing tube is slidable, said outer case being formed with a longitudinal slot whereby removal of the sterilizing tube is facilitated and which also serves for viewing purposes.

In testimony whereof I have signed my name in the presence of two subscribing witnesses.

ALEXANDER JOSEPH VINCENT McDONNELL.

Witnesses:
E. C. WALKER,
L. E. GREENACRE.